United States Patent Office 3,753,929
Patented Aug. 21, 1973

3,753,929
STRIKE INCORPORATION OF MOLECULAR SIEVES FOR FLUID CRACKING CATALYSTS
John Francis Lindsley, Stamford, Conn., assignor to American Cyanamid Company, Stamford, Conn.
No Drawing. Filed Sept. 16, 1970, Ser. No. 72,862
Int. Cl. B01j *11/36, 11/40*
U.S. Cl. 252—451     10 Claims

ABSTRACT OF THE DISCLOSURE

A process for preparing an improved aluminosilicate-containing silica-alumina hydrocarbon cracking catalyst comprising adding an alkali metal silicate to a mineral acid until the pH is above 3.5, dispersing a calcined crystalline aluminosilicate in the silica sol, continuing the addition of alkali metal silicate until gelation occurs, aging the gel, thereafter adjusting the pH of the gel to 3.0 with an aluminum salt, coating the aluminosilicate-silica substrate, washing at a pH of 4.0, then washing with ammonia at a pH of about 7.0, and drying the formed product.

---

This invention relates to a catalyst composition containing aluminosilicates. More particularly, this invention is directed to a novel method for the manufacture of an aluminosilicate-containing silica-alumina catalyst.

It has long been known to employ silica-alumina composites as catalysts and as carriers for various catalytic materials in a large variety of reactions. In general, these materials are prepared by first forming a silica hydrogel, impregnating this hydrogel with a solution of aluminum salt, precipitating the alumina onto the silica hydrogel, washing the resulting silica-alumina composite to remove soluble impurities, drying, and activating.

While the above-described process has provided a satisfactory catalyst, it has been recently found that crystalline aluminosilicate zeolites, sometimes referred to as molecular sieves, containing hydrogen ions, alkaline earth, rare earth metal cations and others may be incorporated into the porous matrix resulting in an enhanced catalyst which is more active than the silica-alumina composite used alone.

It is known that aluminosilicate zeolites tend to become unstable when exposed to highly acidic conditions. Since large fluctuations in pH are normally encountered in silica-alumina catalyst preparation in order to control surface area, pore volume, and other physical characteristics, the prior art has attempted to overcome this unfortunate aluminosilicate characteristic by the incorporation of sieves subsequent to the matrix formation but prior to drying, or under heavily restricted and complicated silica-alumina matrix formation. The use of the former method results in poor and undesirable aluminosilicate distribution while the latter requires an expensive and difficult technique which is not always successful in avoiding the problem of aluminosilicate destruction.

It is an object of this invention to provide for a stable, active aluminosilicate-containing silica-alumina catalyst. It is a further object of this invention to provide a simple and economic process for preparing an aluminosilicate-containing silica-alumina matrix. Another object is to prepare an aluminosilicate-containing silica-alumina catalyst which has a uniform sieve distribution. It is a further object to provide a process which will not harm the pH sensitive molecular sieves. Other objects and advantages will appear from a full understanding of the ensuing disclosure.

This invention contemplates a process for the preparation of catalysts containing crystalline aluminosilicate zeolites in a water-containing matrix material which contains a silica hydrogel and an unprecipitated metal compound of the Groups II–A, III–A, and IV–A of the Periodic System of Elements. The invention is characterized in that an aqueous suspension of a partially or fully exchanged aluminosilicate zeolite which has been thermally treated is combined with an aqueous acid alkali metal silicate solution and subsequent to the addition the silica is made to gel from this solution by the addition of further alkali metal silicate. The resulting zeolite containing gel is combined with one or more solutions of compounds containing at least one metal of the Groups II–A, III–A, and IV–A, of the Periodic Table and hydrolyzed. The subsequently coated catalyst material is washed, dried, and further treated as necessary.

The process of this invention is distinguished by being simple to operate and economic. The catalysts obtained by the process are distinguished by good activity and selectivity.

With the process according to this invention it is possible to use a large variety of both naturally occurring and synthetic aluminosilicate zeolites including but not limited to those of the X-type, Y-type, A-type, T-type, Mordenite-type and others. Synthetic crystalline zeolites of the faujasite type are desirable. Thus, for example, zeolites of the X-type as described in U.S. Pat. 2,882,244 and zeolites of the Y-type as described in U.S. Pat. 3,130,007 are generally preferred. These preferred zeolites have a pore structure containing openings from 6 A. to 15 A. The sodium form of zeolite X has the formula:

$$(0.9 \pm 0.2)\ Na_2O,\ Al_2O_3,\ (2.5 \pm 0.5)\ SiO_2,\ 0\text{–}8\ H_2O$$

and the sodium form of zeolite Y is $$(0.9 \pm 0.2)\ Na_2O,\ Al_2O_3,\ (3\text{–}6)\ SiO_2,\ 0\text{–}9\ H_2O$$

It is well known that when aluminosilicates are to be used as cracking catalysts it is desirable that the zeolites should have the minimum alkali metal content. A high alkali metal content undesirably reduces the thermal structural stability so that the effective life of the catalyst is adversely effected.

The alkali metal content may be reduced by a base exchange process wherein the alkali metal containing zeolite is repeatedly or continuously brought into contact with aqueous solutions containing cations of other compounds in order to effect the exchange of the alkali metal ions in the aluminosilicates for the cations in the aqueous solution. In this way alkali metal ions can be replaced by alkaline earths, such as, calcium, magnesium, etc., rare earths, hydrogen precursors such as ammonia, and other ions.

Rare earth metals which may be employed within the scope of this invention include, but are not limited to, rare earth metal chlorides which predominantly comprise chlorides of Cerium (Ce), Europiun (Eu), Gadolinium (Gd), Lanthanum (La), Neodymium (Nd), Prastodymiun (Pr), Samorium (Sm), and Yttrium (Y) chloride, or with an aqueous solution of didymium chloride which is a mixture of rare earth metal chlorides having a low cerium content.

One aspect of this invention is that an aqueous suspension of a zeolite which has been exchanged with rare earth or alkaline earth cations and then thermally treated may be advantageously employed to obtain a product of reduced alkali metal content. To obtain an optimum result, it is advisable to avoid using the zeolite in dry form or a zeolite which has not been exchanged once for rare earth metals and subsequently calcined thus reducing to a minimum the expensive time consuming base exchange. The thermal treatment comprises subjecting the zeolite after exchange to an inert medium such as air at 120 to 900° C. and preferably 400 to 700° C.

In accordance with the invention, an aqueous acid solution is prepared by employing a mineral acid which may include but should not be limited to sulfuric acid, hydrochloric acid, phosphoric acid, nitric acid, and others with water. An alkali metal silicate which may be in aqueous solution and slowly added to the acid heel until a pH of from 3.5 to 6 is reached. It has been found advantageous to cease the addition of silicate when the pH reaches a value of from 4.0 to 4.5.

It is now possible to safely add the aluminosilicate zeolites to the aqueous acid-alkali metal silicate solution. This may be done in any manner but as mentioned earlier it is preferable to add the zeolite material as an aqueous slurry. After the addition of the aluminosilicate material, addition of alkali metal silicate is continued until the pH rises to a point where gelling occurs. While gellation may occur if the acid-silicate solution is aged for a long enough period, it has been found very desirable to add the total amount of silicate required in two steps, one prior to sieve addition, and one subsequent, before the gellation occurs. By continuing to raise the pH prior to gellation with additional alkali metal silicate solution, improved physical properties of the finished catalyst may be obtained.

The silica hydrogel containing the sieves is aged in a conventional manner which may last for several minutes to several hours. Following the aging step, the pH is reduced to 3.0 or above employing an aluminum salt solution containing a minimum of free acid. It has been found desirable to employ an aluminum sulfate solution containing about 7.4% $Al_2O_3$ in this step.

It should be noted that at no time after sieve incorporation or addition is acid added to the batch. This is important because the addition of acid, even while the pH of the overall mixture may be alkaline, creates zones of high acidity. Crystalline aluminosilicate zeolites which are present in these zones may be irreversably damaged by the acid. It is an important advantage and feature of this invention that acid not be added after the sieves have been incorporated into the acid-alkali metal silicate solution which has a pH as heretofore mentioned above 3.5. While the advantages of the invention are clear here and will be further demonstrated by the examples, it should be additionally noted that the invention lends itself well to commercial operations where efficient laboratory mixing and pH control techniques are not easily duplicated. The risk of zeolite damage is rendered minimal by the technique of this invention and this can be shown by improved catalyst characteristics.

The zeolite containing silica hydrogel may be advantageously subjected to homogenization in the presence of the aluminum salt solution. This procedure is described in my copending U.S. application Ser. No. 672,442, filed Oct. 3, 1967. Generally, the technique involves the breaking-up of the gel in the presence of an aluminum salt solution by Fitzmilling using a 20 mesh screen. This results in a greater uniformity of alumina distribution, and improved filterability of the catalyst product.

The slurry containing the aluminosilicate, silica gel, and aqueous aluminum salt solution is finally treated with sodium aluminate. It is desirable to control the pH in a range of from 3.0 to 5.0 and, preferably, from 3.6 to 4.9 by alternately adding sodium aluminate and aluminum sulfate. The final pH should be from 4.6 to 4.9 and may be adjusted with ammonia if desired.

The alumina coated aluminosilicate-silica gel is washed to remove impurities in any conventional manner. As heretofore mentioned, one embodiment of the invention resides in the strike incorporation of calcined rare earth soda sieves or calcined alkaline earth metal soda sieves. These provide an active and inexpensive composite catalyst which is characterized by having an extremely low soda content in the final product. This is achieved by a preferred method of washing. By this technique a first and subsequent washings are conducted at a pH of about 4.0 to remove sodium and sulfate ions present on the silica-alumina composite itself. A further and higher pH washing is conducted with ammonia which effects a further reduction in the sulfate and additionally reduces the soda content of the sieves themselves. Thus, by employing the unique process of this invention, the acid strike incorporation of calcined partially exchanged soda sieves followed by coating and ammonia washings the alkali metal content of the final aluminosilicate silica-alumina composite can be reduced to 0.08% and lower.

This reduction in alkali metal content is coupled with an economic process resulting in a product having high activity is surprising since prior art teachings have not indicated that such a result is possible.

The final product may be spray dried or treated in another appropriate and conventional manner. It should be completely understood that further process steps may be employed and various modifications and additional steps may be used within the above general framework.

In addition to the above, an inorganic additive material, such as, for example, various clays including kaolin clay may be added to the catalyst with the zeolites during the acid strike. The amount of clay addition material is not critical but it is preferable that the total weight of sieves and clay should not be greater than 45% by weight of the total product in order to achieve the maximum desired attrition resistance.

The alumina-coated aluminosilicate-silica composite catalyst product may be finally subjected to homogenization, ball milling, further Fitzmilling, and other treatments which may affect their physical characteristics.

The catalysts obtained by this invention have very good activity and selectivity. These properties are important factors in assessing the quality of a catalyst and can be determined from the behavior of the catalyst when used for catalytic cracking under specific reaction conditions employing an identifiable petroleum fraction. Mid Continent gas oil having a boiling range of 272° C. to 405° C. is often employed.

The activity of the catalyst is defined as the ratio between the space velocity of the feed by weight through the steam-conditioned catalyst under examination and the space velocity of the feed by weight through a similarly conditioned standard catalyst to give an equal conversion.

The selectivity of the catalyst may be expressed by the gasoline factor, the gas factor, the coke factor. The selectivity of the catalyst expressed in the form of a gasoline factor is defined as the ratio between the gasoline yield by weight ($C_5^+$ of up to 204° C.) using the steam-conditioned catalyst under examination and the gasoline yield by weight employing a similarly conditioned standard catalyst, the two being determined from the same conversion. The gas factor and the coke factor may be defined in an identical fashion. The abovementioned conversions occurring during cracking are defined as follows:

Percent conversion $$= \frac{(\text{weight of feed}) - (\text{weight of all fractions boiling above 204° C.})}{\text{weight of feed}} \cdot 100$$

The tables which are derived from the examples clearly demonstrate a few of the advantages of the invention. An Eight Minute AGC test was used which is a slight modification of the standard AGC test which is described in Cyanamid's Test Methods for Synthetic Fluid Cracking Catalyst. The Eight Minute test runs for that period using a weight basis rather than volume at 900° F.

The following examples are presented to illustrate some of the advantages and embodiments of the invention. The invention, however, should not be limited thereto except as appearing from the appended claims. All parts are by weight unless otherwise stated.

EXAMPLE 1

Acid strike technique using re-calcined 12% RE $NH_4^+$ sieves in 18% $Al_2O_3$-$SiO_2$ matrix Sixteen and one quarter pounds of 98% $H_2SO_4$ was added to 500 pounds of water which was agitated in a tank. A dilute solution of sodium silicate (Philadelphia "N" Brand containing 28.7% $SiO_2$) in a ratio of 120 pounds of sodium silicate to 160 pounds of water was mixed in a second addition tank. The dilute silicate solution was then added at a controlled rate of about two gallons per minute to the acid heel. When the pH climbed to 3.8, a slurry containing 5.8 pounds of 1250° F. calcined rare earth, ammonium exchanged sieves of the Y-type (Linde SK–30®) having 0.93% $Na_2O$ D.B. was added to the batch. More dilute silicate was added and the pH increased to 7.0, at which point the batch gelled. The rest of the silicate brought the pH up to 7.9. The batch temperature was 80° F. at this point.

After an age period of 12 minutes, aluminum sulfate solution containing about 7.5% $Al_2O_3$ was added bringing the pH down to 3.6. The batch was diluted with about 100 pounds of water and then Fitzmilled using a 20 mesh screen. The milled slurry was repumped to a tank where sodium aluminate and aluminum sulfate were alternately added so as to hold the pH in a 3.6–4.9 range. A total of 74 pounds of aluminum sulfate solution and 12.2 pounds of sodium aluminate solution containing about 23% $Al_2O_3$ were used. The final pH was adjusted to 4.9 with a 14% ammonia solution.

The coated gel was given the standard three steps of washing that is two washings at low pH of about 4.0 and one at a raised pH of 7.3 employing ammonia. The washed gel was then spray dried.

Steamed activities after 750° C. steaming for 17 hours are shown in Table I. Sieve distribution as measured by rare earth analysis are shown in Table II. It should be noted that the calculated weight percent of $RE_2O_3$ as shown in Table II at (b) is calculated from the analysis of the +325 and —325 size fractions shown below in that table.

EXAMPLE 2

Alkaline strike technique using re-calcined 12% RE $NH_4^+$ sieves in 18% $Al_2O_3$-$SiO_2$ matrix Five and eight-tenth pounds of 1250° F. calcined rare earth, ammonium exchanged sives of the Y-type the same type sieves as used in Example 1 were added to a heel of 120 pounds of sodium silicate (28.7% $SiO_2$) and 500 pounds of water. Over a period of 14 minutes, 25% $H_2SO_4$ was added to the batch which terminated in this gelling of the batch. After breaking up the gel an additional amount of the same acid was added to adjust the pH down from the gel point of 9.5 to 7.5. The batch temperature was 80° F. At the end of a 12 minute age time, a small amount of acid was slowly added bringing the pH to 5.0. Alum was then added, bringing the pH down to 3.8. The gel was Fitzmilled, coated and filtered, following the procedure of Example 1.

The steamed activity values are shown in Table I and the sieve distribution values are shown in Table II for this catalyst.

EXAMPLE 3

Alkaline strike technique using calcined once exchanged, 12% RE Na sieves in 18% $Al_2O_3$–$SiO_2$ matrix One hundred and twenty pounds of sodium silicate (28.7% $SiO_2$) and 500 pounds of water were added to a tank. Five and eight-tenth pounds of once exchanged rare earth sodium sieves of the Y-type (having about 3.5 to 4.0% $Na_2O$ d.b.) which had been calcined at 1250° F. was added to the aqueous silicate solution. Over a 14 minute period, 25% $H_2SO_4$ was added terminating in the gelling of the batch. After breaking up of the gel, additional acid was added to adjust the pH to 7.5. The batch temperature was 80° F. After a 12 minute aging period, a small amount of acid was added slowly bringing the pH to 5.0. Alum was added to adjust the pH to 3.8 and the gel was then Fitzmilled, coated, filtered, and spray dried following the procedure of Example 1.

The steamed activity results are shown in Table I.

EXAMPLE 4

Incorporation of re-calcined 12% RE $NH_4^+$ sieves in a washed hydrogel prior to spray drier incorporation in 18% $Al_2O_3$–$SiO_2$ matrix A batch of washed 18% $Al_2O_3$-silica hydrogel was prepared as in Example 2 except there was no addition of sieves to the strike.

After washing the silica-alumina hydrogel, 0.682 lbs. (dry basis) of rare earth, ammonia Y-type sieves (sieves similar to those used in Example 1 except that they were not recalcined) were blended with 5.0 lbs. (dry basis) of the hydrogel and then spray dried.

Steamed activities are shown in Table I. Sieve distribution for a typical 12% sieve in a silica alumina matrix is shown in Table II.

EXAMPLE 5

Acid strike technique using re-calcined 12% RE $NH_4^+$ sieves in an extended matrix Three thousand eighty (3,080) milliliters of 96% $H_2SO_4$ were added to a clay slurry containing 26 pounds of Georgia Kaolin's Hydrite R Clay which contains about 86% ignited solids, in 450 pounds of water. The acid heel-clay slurry had a pH of 0.6 and a temperature of 92° F. Sodium silicate having 28.7% $SiO_2$ was added to the agitated batch at the rate of about 2500 milliliters per minute. After approximately 11 minutes the pH had increased to 5.1. The sodium silicate flow was stopped and a slurry containing 7.5 pounds (ignited basis) of exchange and calcined rare earth amonium Y-type sieves in about 20 pounds of water was added; the pH immediately fell to 3.3. The batch was agitated for about three minutes and then the sodium silicate flow was resumed. At a pH of 6.4 the batch gelled. A total of 88 pounds of sodium silicate was added. Aluminum sulfate solution having 7.4% $Al_2O_3$ was added to bring the pH down to 3.3. The batch was milled and coated as in Example 1. A total of 50 pounds of aluminum sulfate solution and 14 pounds of sodium aluminate having about 25% $Al_2O_3$ was used during the coating step. The final pH was adjusted to 4.9 with 14% $NH_3$ solution.

The hydrogel was washed and spray dried as in Example 1. Activities after steaming are shown in Table I.

EXAMPLE 6

Acid strike technique using calcined once exchanged 12% RE Na sieves in an extended matrix An identical procedure to that described in Example 5 was followed except that the temperature of the acid clay heel was raised to 94° F. and the sieves employed were once exchanged rare earth sodium Y-type sieves which were calcined at 1100–1200° F.

Activities after steaming are shown in Table I.

EXAMPLE 7

Alkaline type strike 11 3/4% RE $NH_4^+$ sieves in an extended matrix (spray drier feed incorporation)

Dilute sulfuric acid (25% $H_2SO_4$) was added at a rate of about one-half gallon per minute to a slurry containing 140 pounds of sodium silicate (28.7% $SiO_2$), 49 pounds of Georgia Kaolin's Hydrite R Clay, and 1,100 pounds of water. After 14 minutes the pH fell from the initial 10.9 to 7.8 at which point the batch gelled and the acid flow was stopped. The batch temperature was 103° F. After a 4 minute aging period during which the gel was broken up, the acid flow was resumed at two-tenths gallon per minute. The pH fell to 2.8 and the acid flow was stopped.

The batch was milled and then coated using 83 pounds of aluminum sulfate solution containing about 6.9% $Al_2O_3$ and 24 pounds of sodium aluminate solution having about 23.5% $Al_2O_3$. After three stages of washing, two at low pH and one at 7.5 pH the solids were determined. A slurry of re-calcined rare earth ammonium exchanged sieves of the Y-type were added to give a sieve content of 11¾% by weight and the mixture was spray dried.

Activities after steaming are shown in Table I.

TABLE I.—CONVERSION-SELECTIVITY OF EXAMPLE PRODUCTS MEASURED BY 8 MINUTE AGC TEST

| Example | Apparent bulk density. gms./cc. | Surface area. m.²/gm. | Conversion. percent | Gasoline factor | Coke factor | $C_5+$ |
|---|---|---|---|---|---|---|
| 1 | 0.62 | 175 | 74 | 0.64 | 0.34 | 1.66 |
| 2 | 0.66 | 176 | 72 | 0.65 | 0.37 | 1.53 |
| 3 | 0.61 | 179 | 67 | 0.55 | 0.42 | 1.41 |
| 4 | 0.65 | 176 | 72 | 0.58 | 0.36 | 1.55 |
| 5 | 0.58 | 125 | 73 | 0.76 | 0.34 | 1.48 |
| 6 | 0.57 | 140 | 73 | 0.59 | 0.31 | 1.57 |
| 7 | 0.62 | 115 | 66 | 0.62 | 0.45 | 1.36 |

NOTE.—All samples were steamed at 750° C. for 17 hours prior to testing.

TABLE II.—SIEVE DISTRIBUTION RESULTS

| | Example | | | | |
|---|---|---|---|---|---|
| | 1 | | 2 | | 4 |
| Finishing treatment | None | | None | | None |
| a Analysis, wt. percent $RE_2O_3$ | 1.78 | | 1.90 | | |
| b Calculated, wt. percent $RE_2O_3$ | | 1.87 | | 1.87 | 1.66 |
| ~ percent sieve | 8.8 | 9.2 | 9.3 | 9.2 | 8.2 |
| +325 mesh fraction, wt. percent | 72 | | 67 | | 70.2 |
| c Percent $RE_2O_3$ | 1.88 | | 1.86 | | 1.16 |
| ~ percent sieve | 9.3 | | 9.2 | | 5.7 |
| Distribution c/a, c/b | 1.06 | 1.01 | 0.97 | 0.99 | 0.70 |
| −325 mesh fraction, wt. percent | 28 | | 33.1 | | 29.8 |
| d Percent $RE_2O_3$ | 1.84 | | 1.94 | | 2.82 |
| ~ percent sieve | 9.1 | | 9.6 | | 13.9 |
| Distribution d/a, d/b | 1.03 | 0.98 | 1.02 | 1.04 | 1.70 |
| 1 hr. attrited | | | | | |
| e Calcd., wt. percent $RE_2O_3$ | | 1.69 | | 1.77 | 1.52 |
| +325 mesh fraction, wt. percent | 74.6 | | 67.2 | | 70.6 |
| f Percent $RE_2O_3$ | 1.60 | | 1.72 | | 1.16 |
| ~ percent sieve | 7.9 | | 8.5 | | 5.7 |
| Distribution f/a, f/e | 0.90 | 0.95 | 0.91 | 0.97 | 0.70 0.77 |
| −325 mesh fraction, wt. percent | 26.4 | | 32.8 | | 29.4 |
| g Percent $RE_2O_3$ | 1.94 | | 1.86 | | 2.36 |
| ~ percent sieve | 9.6 | | 9.2 | | 11.6 |
| Distribution g/a, g/e | 1.10 | 1.14 | 0.98 | 1.05 | 1.42 1.56 |

I claim:

1. A process for preparing an aluminosilicate-containing silica-alumina hydrocarbon cracking catalyst comprising adding an alkali metal silicate to a mineral acid until the pH is above about 3.5, dispersing a crystalline aluminosilicate zeolite in the acid-silicate solution, said crystalline aluminosilicate having been exchanged with a cation selected from rare earth, alkaline earth, and ammonium cations and having been calcined following said exchange, continuing adding silicate until gelation occurs, aging the gel to form a catalyst substrate, adjusting the pH to above about 3.0 with an aluminum salt, coating the catalyst substrate with alumina, followed by washing and drying the product thus obtained.

2. The process according to claim 1 wherein the washing includes an aqueous ammonia solution having an alkaline pH.

3. The process according to claim 1 wherein the crystalline aluminosilicate is a Y-type sieve, base exchanged with a cation selected from the group of rare earth metals and alkaline earth metals.

4. The process according to claim 1 wherein a clay is present in the silica gel with the crystalline aluminosilicate in an amount such that the weight of the sieve and clay is not greater than about 45% of the weight of the dried catalyst material.

5. The process according to claim 4 wherein the clay is kaolin clay.

6. The process according to claim 1 wherein the crystalline aluminosilicate is added to the acid-silicate mixture at a pH of from 4.0 to 4.5.

7. A process for preparing an aluminosilicate-containing silica-alumina hydrocarbon cracking catalyst which comprises: adding an alkali metal silicate to a mineral acid until the pH is above about 3.5; dispersing a calcined crystalline aluminosilicate zeolite which has been exchanged with cations of rare earth metals, in the acid-silicate solution; continuing the addition of silicate until gelation occurs; aging the gel to form an aluminosilicate-silica substrate; thereafter adjusting the pH of the gel to above about 3.0 with an aluminum salt; coating the aluminosilicate-silica substrate with alumina; washing the alumina coated aluminosilicate-silica composite at a pH of about 4.0 followed by washing at a pH of about 7.0 with ammonia solution; and drying the product thus obtained.

8. The process according to claim 7 wherein the calcined crystalline aluminosilicate is a Y-type sieve.

9. The process according to claim 7 wherein the calcined crystalline aluminosilicate is added to the acid-silicate mixture at a pH of from 4.0 to 4.5.

10. An aluminosilicate-containing silica-alumina hydrocarbon cracking catalyst prepared by the process according to claim 7.

References Cited
UNITED STATES PATENTS

| 3,277,018 | 10/1966 | Plank et al. | 252—451 |
| 3,499,846 | 3/1970 | Michalko | 252—451 |
| 3,472,792 | 10/1969 | Vesely et al. | 252—451 |
| 3,592,778 | 7/1971 | Vesely | 252—451 |
| 3,553,104 | 1/1971 | Stover et al. | 252—451 X |

CARL F. DEES, Primary Examiner

U.S. Cl. X.R.

252—455 Z